United States Patent
Pakkala et al.

(10) Patent No.: US 9,736,914 B2
(45) Date of Patent: Aug. 15, 2017

(54) INTELLIGENT LIGHTING CONTROL

(71) Applicant: CASAMBI TECHNOLOGIES OY, Espoo (FI)

(72) Inventors: Timo Pakkala, Espoo (FI); Elena Lehtimaki, Luhtajoki (FI)

(73) Assignee: CASAMBI TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/027,189

(22) PCT Filed: Oct. 3, 2013

(86) PCT No.: PCT/FI2013/050960
§ 371 (c)(1),
(2) Date: Apr. 4, 2016

(87) PCT Pub. No.: WO2015/049412
PCT Pub. Date: Apr. 9, 2015

(65) Prior Publication Data
US 2016/0242264 A1    Aug. 18, 2016

(51) Int. Cl.
*H05B 37/00* (2006.01)
*H05B 37/02* (2006.01)
*H05B 33/08* (2006.01)

(52) U.S. Cl.
CPC ..... *H05B 37/0272* (2013.01); *H05B 33/0854* (2013.01); *Y02B 20/48* (2013.01)

(58) Field of Classification Search
CPC ............ H05B 37/0272; H05B 33/0803; H05B 33/0854; H05B 37/0227; H05B 37/029; H05B 37/03
See application file for complete search history.

(56) References Cited

U.S. PATENT DOCUMENTS

2004/0122930 A1    6/2004  Pasternak
2006/0154598 A1    7/2006  Rudland et al.
(Continued)

FOREIGN PATENT DOCUMENTS

EP       2 642 828 A1     9/2013
WO    2004/109974 A1    12/2004
(Continued)

OTHER PUBLICATIONS

International Search Report, dated May 19, 2014, from corresponding PCT Application.
(Continued)

*Primary Examiner* — Monica C King
(74) *Attorney, Agent, or Firm* — Young & Thompson (57) ABSTRACT

Method for controlling a plurality of luminaire units with at least one dedicated light source, and at least functionally connected control entity incorporating a wireless transceiver, the luminaire units configured to communicate via a mesh network established utilizing the wireless transceivers thereof, wherein at least one of the luminaires is electrically connected to a user-operable switch device for controlling the luminaire, the method including detecting, at the at least one luminaire, signal triggered by switching action, determining, in response to the detection, at the at least one luminaire unit a control action of the at least one light source and a message to be wirelessly transmitted in the mesh network to enable other luminaire units in the network to execute a responsive luminaire control action as configured in the control logic entities thereof based on the captured message, and executing the control action and transmission of the message.

20 Claims, 3 Drawing Sheets

(56) References Cited

U.S. PATENT DOCUMENTS

| | | |
|---|---|---|
| 2009/0243517 A1 | 10/2009 | Verfuerth et al. |
| 2009/0315485 A1 | 12/2009 | Verfuerth et al. |
| 2010/0076615 A1 | 3/2010 | Daniel et al. |
| 2011/0316453 A1 | 12/2011 | Ewing |
| 2012/0112654 A1 | 5/2012 | Choong et al. |
| 2013/0065642 A1 | 3/2013 | Liu |
| 2013/0193847 A1* | 8/2013 | Recker ............... H05B 33/0803 315/86 |
| 2013/0198786 A1 | 8/2013 | Cook et al. |
| 2013/0200703 A1 | 8/2013 | Liao et al. |
| 2013/0293149 A1 | 11/2013 | Stockburger et al. |

FOREIGN PATENT DOCUMENTS

| | | |
|---|---|---|
| WO | 2009/020776 A1 | 2/2009 |
| WO | 2009/124217 A1 | 10/2009 |
| WO | 2012/145766 A2 | 10/2012 |

OTHER PUBLICATIONS

British Search Report, dated Feb. 4, 2014, from corresponding British Application No. 1317506.2.
Extended European Search Report, dated May 12, 2017, from corresponding European Application No. EP 13894959.

\* cited by examiner

INTELLIGENT LIGHTING CONTROL

FIELD OF THE INVENTION

Generally the invention pertains to lighting, electronics and communication. In particular, however not exclusively, the present invention concerns luminaires and user-based control thereof

BACKGROUND

Following the advent of larger scale electricity harnessing dating back to the 19$^{th}$ century, a myriad of electricity powered devices more or less facilitating the life of individuals through automation have been set forth ever since in many different contexts like industry, office and home. Home automation or generally building automation incorporates various aspects relating to the integrated, typically centralized and computerized control of different appliances such as fridges, freezers, and audio/video equipment, heating and ventilation devices, security systems and other monitoring or locking solutions, watering and generally water control, communication devices, not forgetting one of the most important applications, namely lighting. In the automation of lighting, rather self-evident goals such as optimized lighting conditions in terms of brightness/intensity, color and direction, and energy conservation are usually sought after.

Lighting automation systems have traditionally been both complicated and expensive industrial-scale solutions that have practically necessitated using special luminaires and conducting preparatory actions prior to or, at the latest, upon installation thereof through pre-wiring the walls and related other fixed structures in the target environment, for instance. Obviously, such traditional 'smart lighting' arrangements, or in more technical terms, lighting control systems, have been pricey and therefore unsuitable for use with many if not most ordinary residential spaces such as private houses and even typical industrial or office scale premises. Indeed, they have required using physically installed dedicated wires/data buses and a number of central computers with use-specific user interfaces (UI) such as touch panel-included wall-installed terminals in addition to the special luminaires to provide the designed overall functionality and adjustability as advertised in the product marketing materials. One evident further drawback of such tailored hardware-based solutions resides in the obviously growing number of required processing and control apparatuses, which can actually be surprisingly annoying everyday phenomenon that is already well realized by all those who have e.g. few remote controller provided consumer electronics devices, air conditioners, alarm devices, etc. at home. What ultimately happens is that multiple remote controls are lying around on tables and degrade the aesthetics of the living room by making it look somewhat messy but still, the right one cannot be easily located for brief use such as a single adjustment action when needed.

SUMMARY

In the light of the foregoing discussion, the general objective of alleviating one or more of the aforesaid defects associated with the existing prior art solutions is achieved by various embodiments of a lighting arrangement and related method in accordance with the present invention suitable for providing flexible, adjustable lighting experience in industrial, commercial and in particular, residential environments such as houses.

Thereby, in one aspect of the devised solution a lighting arrangement comprises
a plurality of luminaire units, each provided with at least one dedicated light source, such as a LED (light-emitting diode), and at least functionally connected control logic entity with a wireless transceiver, said plurality of luminaire units being configured to communicate via a mesh network established utilizing the wireless transceivers thereof,
wherein at least one of said luminaire units is functionally, preferably at least electrically, connected to a user-operable switch device, optionally an on/off power switch such as a wall-mounted on/off switch, for controlling the luminaire unit, and
the control logic entity associated with said at least one luminaire being configured to, upon detection of a predetermined signal, optionally signal pulse or signal state sequence, responsive to and indicative of the operation of the control switch device, transmit a predetermined message via the wireless transceiver to enable the other luminaire units in the mesh network receiving the message to execute a responsive luminaire, optionally light source, control action as configured in the control logic entities thereof relative to the captured message.

Typically the switch is fixedly mounted (e.g. wall-mounted) and comprises a power switch or generally a power switching means aimed for controlling the light source(s) and basically capable of controlling the whole luminaire unit, whereupon through switch operation both the external power supply to the luminaire unit may be controlled and control signal(s) cleverly provided. As to be contemplated in further detail hereinafter, the luminaire unit may comprise an internal "reserve" power supply for executing actions also when the associated switch, also acting as the power switch, is toggled in 'off' position (external power circuit opened).

The control logic entity may be configured to determine and trigger, in response to said detection, at said at least one luminaire unit a control action of the at least one light source of the unit. Generally a control action may in this context adapt the brightness of one or more light sources, on/off state of the light sources, emitted color or color tone, the illumination sequence (e.g. blinking or strobing action), alignment (if controlled by a (servo) motor, for instance), illumination pattern, etc.

The predetermined message may indicate the detected switch signal to the recipient. Alternatively or additionally, the message may include command(s)/instruction(s) determined based on the detected signal for controlling e.g. the light source(s) at the remote luminaire units.

In one further embodiment, preferably each luminaire unit of the plurality of luminaire units is configured to relay a message received from other luminaire unit of said plurality to enable further luminaire units of said plurality to receive and react on it. Instead of relaying the message as such, the message may be modified in accordance with a predetermined logic prior to relaying action. In some embodiments, a luminaire unit may relay a message received from a control device such as mobile terminal or a dedicated wireless remote control terminal. In some embodiments, the relayed message may include the original sender and/or relaying device id's.

Optionally, the luminaire unit receiving the message may determine whether it has already received and relayed such message before, and when this is the case, to omit another relaying action. A luminaire unit may maintain at least temporary record of received, relayed and/or transmitted message(s).

In a further embodiment, based on the received message from other luminaire unit or a remote control terminal, the control logic entity of the receiving luminaire unit may be configured to determine and trigger at said luminaire unit a control action of the at least one light source of the unit.

Yet in a further embodiment, the receiving luminaire may be configured to acknowledge the receipt of the message by sending an acknowledgement. Alternatively or additionally, unacknowledged transfer of messages may be utilized in the network depending on e.g. the particular luminaire unit in question.

Still in a further embodiment, a message by a luminaire unit or a control terminal may include a number of predetermined commands, instructions, state or state change notifications and/or status (change) notifications, to notify and/or control the recipient luminaire units.

In a further embodiment, the user-operable control switch is a toggle switch. The toggle switch may be two-state power switch or a switch with further states. In some embodiments, the switch may incorporate a dimmer type function with analogue or analogue type control wheel or other control input feature.

In a further embodiment, the control logic entity may be configured to determine the message to be sent and/or the control action of the at least one light source based on at least one element associated with the detected signal indicative of the switch usage, selected from the group consisting of: signal state (e.g. up/down), signal state change, duration between a state change, duration between pulses, number of state changes in a sequence, number of pulses in a sequence, the start state, the end state, signal amplitude, signal magnitude, and signal phase. For example, one switching sequence to be recognized may indicate one on/off (back-and-forth action) or other dual-action followed by a temporally separable single action (e.g. back to on) or another dual-action or even more complex action. The duration between the initial action and subsequent action(s) may be then mapped into a light source control action such as light brightness or color (tone) change responsive to the length of the duration, for instance.

In a further embodiment, the wireless transceiver comprises at least one element selected from the group consisting of: short-range transceiver, low-power transceiver, Bluetooth™ compliant transceiver, Bluetooth Low-Energy™ (Bluetooth LE) compliant transceiver, Z-Wave™ compliant transceiver, and ZigBee™ compliant transceiver.

In a further embodiment, the utilized routing technique(s) within the mesh network includes flooding.

In a further embodiment, a control logic entity includes detection, or 'wake-up', circuit to monitor the switch signal, switch signal state change and/or related signal pulse, and preferably wake up or 'ramp up' predetermined element(s) such as the processing unit of the control logic entity in response thereto.

In a further embodiment, and as already alluded hereinbefore, luminaire unit includes internal power source preferably configured to (re)charge itself utilizing the switch signal and to power up e.g. the control logic entity. In some embodiments the power source may include a capacitor with predetermined, sufficient capacitance to enable the control logic entity still to execute a number of predetermined tasks even if the external power supply is not connected anymore. This typically happens when the switch is placed in off position usually meaning the circuit from the mains is opened. For example, a message may be transmitted to other luminaire units to control the associated light source(s) according to predetermined logic, such as turning them off.

In a further embodiment, the at least one luminaire unit is configured to detect a master unit selection (activation) indicating signal, wherein the signal is also due to the operation of the control switch device. Such signal may be thus provided as a dedicated signal via the switch, or together with other signal(s) controlling the local control logic entity and/or light source, i.e. as an aggregate signal or a multi-part signal. The signal indicates the luminaire unit is assigned a master role in the mesh network, i.e. the local switching actions associated with the unit may be converted into messages sent towards other luminaires for executing predetermined (corresponding or other associated) control actions regarding e.g. the light source(s) thereat.

Optionally, the messages may indicate the master role of the sender. Alternatively, messages based on local switch operations may be only sent by a luminaire in the mesh when the sender is provided with the master role, i.e. the master role may be in some embodiments required to transmit the predetermined message(s) in the mesh towards other luminaire units based on local switch operation and switch signal reception. A newly appointed master luminaire unit may, on the other hand, be configured to transmit a status message indicative of such role (change) in the mesh network so that the recipients may register the role change as well and act accordingly in the future upon receipt of subsequent messages from the master device even when the subsequent messages do not explicitly indicate the sender as 'master' or message as originally coming from a master.

A message indicative of the master unit selection may be received at a luminaire through the wireless receiver from a control terminal (the control terminal may specify in the message the master unit(s)) or from other luminaire (the other luminaire unit normally indicates it has either taken over or relinquishes the master role). In some embodiments, the role of a (original) sender of a received message, which may be thus indicated in the message itself, may be configured to affect the reaction of the recipient. For example, messages not provided by master unit(s) or control terminals, may be omitted or processed differently, optionally just logged and/or relayed, from the messages issued by master unit or control terminal.

In a further embodiment, the arrangement may comprise at least one control terminal already briefly contemplated hereinbefore. The at least one control terminal may include at least one element selected from the group consisting of: mobile terminal, smartphone, dedicated remote controller, laptop computer, desktop computer, wristop computer, and tablet computer.

The computers and other control terminals such as e.g. mobile terminals wirelessly communicating with luminaire units may include general purpose devices provided with tailored software such as native, preferably downloadable, applications.

In some embodiments, the software of the control terminal may comprise a graphical UI configured to render a graphical representation, e.g. digital photograph or more completely computer-generated version, of the space and related one or more luminaire unit(s) (at least the light sources or position(s) thereof) on the display screen. The user may be provided an opportunity to virtually place, e.g. via a touchscreen and related touch action, a luminaire unit/light source in the representation such that it corresponds to the actual physical location thereof, for instance. Subsequently, the UI may be configured to visualize the luminaire unit/light source in the corresponding position in the representation. Related information may be shown in the UI associated with the position, and/or the user may control the luminaire unit via pointing the position in the representation, e.g. via a touchscreen.

In some embodiments, a luminaire unit, or in practice the control logic entity thereof, may be configured to communicate with an external device such as a predetermined computer device to further control the environment. For instance, a message may be sent by the luminaire unit to advance adopting a certain predetermined ambience or generally environmental scheme that may incorporate controlling a consumer electronics device such as television or audio equipment to play video or audio of predetermined genre or kind. Alternatively or additionally, other industrial, office or home appliances, e.g. air conditioning, heating and/or cooling devices, may be controlled accordingly. In some embodiments, the control terminal may reside in between and relay, or generate related control messages towards the actual target device(s) while communicating with the control logic entity of the luminaire unit. In some embodiments, the control terminal may construct new control messages based on user input thereto.

In some embodiments, the arrangement is configured to utilize nonsymmetric control over one or more light sources based on e.g. back-and-forth type switching action. As a simple illustrative example, upon turning a switch in first position, e.g. on position, from second position, e.g. off position, a first group of controllable light sources in one or more luminaire units may be turned on, whereas in response to a compensating switch action (back from second position to first position), a second, potentially overlapping though, group of controllable light sources may be turned off. Similar control over e.g. light sources may be applied in connection with longer switch signal sequences comprising a plurality of pulses as well. The groups may be of different size and constitution what comes the light sources and/or related luminaire units. By utilizing such nonsymmetric control, which is preferably user-adjustable via the control device such as (mobile) terminal, the user may easily turn on selected lights only when arriving at a space such as home but turn off all lighting when leaving, for instance.

Nonsymmetric control could also be executed at a luminaire unit based on multiple (instances of) same messages received from some other luminaire unit or a control terminal.

In some related embodiments, a luminaire unit could already be configured to locally adapt the messages to be sent towards other luminaire units based on several subsequent detections of the same switch sequence from the standpoint of nonsymmetric response so that the receiving units may omit twiddling with nonsymmetric local response at least relative to the received messages (regarding local switch action, that may still be necessary depending on the embodiment).

The switching actions for nonsymmetric control over several luminaire units and related light sources could be generally effectuated through the same switch or via different switches.

In some embodiments, available context data, optionally time of day as indicated by the internal clock of the luminaire unit, for example, may be utilized in the light source control and related tasks. During predetermined hours (e.g. daytime), a certain switching action may convert into a first light control action whereas at predetermined other instant (e.g. during the night), the resulting control action may be different. Preferably, context dependency is user adjustable and the associated settings may be changed at least via the control terminal, optionally also using switch control.

In another aspect, a luminaire unit, comprising a control logic entity (108, 220) with a wireless transceiver (234) to cooperate with at least one, at least functionally connected, light source (110) to illuminate the environment, is configured to communicate with one or more other luminaire units within range via a mesh network established utilizing the wireless transceiver thereof, wherein said luminaire unit is functionally, preferably at least electrically, connected to a user-operable switch device, preferably an on/off power switch such as a wall on/off switch, for controlling the luminaire unit, and the control logic being configured to, upon detection of a predetermined signal, optionally signal pulse or state sequence, responsive to the operation of the control switch device, transmit a predetermined message via the wireless transceiver to enable the other luminaire units in the mesh network to execute a responsive luminaire, optionally light source, control action as configured in the control logic entities thereof relative to the captured message.

In a further aspect, a method for controlling a plurality of luminaire units, each provided with at least one dedicated light source, such as a LED (light-emitting diode), and at least functionally connected control entity with a wireless transceiver, said plurality of luminaire units being configured to communicate via a mesh network established utilizing the wireless transceivers thereof, wherein at least one of said luminaires is, preferably electrically, connected to a user-operable switch device, preferably an on/off power switch such as a wall on/off power switch, for controlling the luminaire, comprises detecting, at said at least one luminaire, signal, optionally signal sequence, triggered by switching action, determining, in response to said detection, at said luminaire unit a control action of the at least one light source and a message to be wirelessly transmitted in said mesh network to enable the other luminaire units in the network to execute a responsive luminaire control action as configured in the control logic entities thereof based on the captured message, and executing the control action and transmission of the message.

Further, the method may incorporate detecting an incoming message from another luminaire unit of said plurality, determining and executing corresponding control action.

As being appreciated by a person skilled in the art, the previously presented considerations concerning the various embodiments of the arrangement may be flexibly applied to the embodiments of the luminaire unit or method mutatis mutandis, and vice versa.

The utility of the present invention arises from multiple issues depending on each particular embodiment thereof. First of all, the invention provides technology for, in particular but not alone, lighting automation and related intelligent, fully configurable control through an effective though relatively simple, affordable, and easy to (post-)install solution. Indeed, the solution has been designed as agnostic as practically possible to the considered use contexts, i.e. the existing lighting infrastructure may be updated to yield the clever control features disclosed herein, or alternatively, the luminaires may be integrated or otherwise supplied with the necessary elements already during manufacturing or assembly. Various embodiments of the invention are feasible for both industrial/office and home applications. Installing additional wiring can be conveniently omitted. The energy consumption the suggested standard power switch and mesh network based control of luminaires requires remains very low and in typical use scenarios the overall consumption figures actually decrease due to the facilitated, more effective and practical utilization of lighting resources. The applied wireless communication methods between the control elements and the luminaires, and between the luminaires themselves, may be of low-power and short-range type, such as Bluetooth Low-Power™, so that the potential RF disturbances to other appliances are minimized while preserving the energy resources.

Standard general use computing devices such as mobile terminals, tablets or laptops may further be utilized to control the lighting. The devices may be provided with innovative UI capable of, for instance, representing the environment graphically including the luminaires therein to improve managing thereof. Alternatively or additionally, the use of dedicated remotes for controlling the luminaires is fully possible. Additional contextual information such as time data may be monitored and used to control the lighting in addition to user-triggered control commands provided via the (wall) power switches. Yet, the lighting devices may be configured to provide control data to external devices to directly or indirectly adjust different ambient or generally target parameters such as background music, air conditioning, etc.

Further benefits relating to the embodiments of the present invention become evident to a skilled person on the basis of following detailed description.

The expression "a number of" refers herein to any positive integer starting from one (1), e.g. to one, two, or three.

The expression "a plurality of" refers herein to any positive integer starting from two (2), e.g. to two, three, or four.

The expression "data transfer" may refer to transmitting data, receiving data, or both, depending on the role(s) of a particular entity under analysis relative a data transfer action, i.e. a role of a sender, a role of a recipient, or both.

The term "transceiver" may refer herein, mainly as a logical term, to physically integrated element providing both data reception and transmission or multiple elements, e.g. a transmitter and a receiver, that together provide such capabilities to the host device or generally host entity. Also a solution comprising both dedicated and shared elements regarding the data transfer directions may be considered as a transceiver in the meaning of the present invention.

The terms "a" and "an" do not denote a limitation of quantity, but denote the presence of at least one of the referenced item.

The terms "first" and "second" do not denote any order, quantity, or importance, but rather are used to distinguish one element from another.

Different embodiments of the present invention are disclosed in the dependent claims.

BRIEF DESCRIPTION OF THE RELATED DRAWINGS

Next the present invention is described in more detail with reference to the appended drawings in which.

DETAILED DESCRIPTION OF THE EMBODIMENTS

Figure 1:
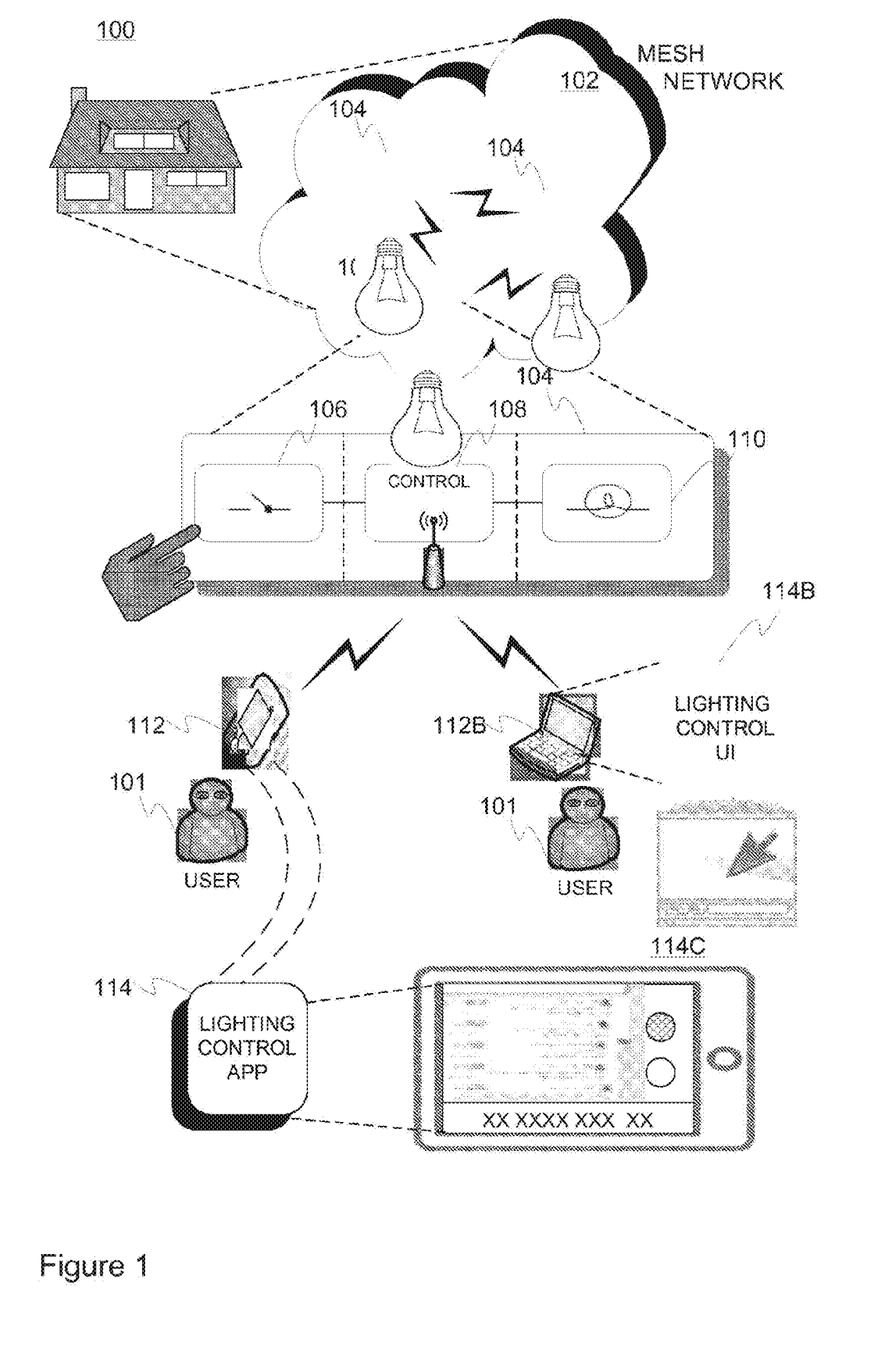
FIG. 1 illustrates the concept underlying various embodiments of the present invention incorporating luminaire units, associated power switch(es) and control devices.

FIG. 1 illustrates, at 100 and by way of example only, the concept underlying various embodiments of the present invention incorporating an arrangement of luminaire units controlling the associated light source(s), switch(es) such as traditional wall-installed toggle-type power switches for providing control commands to the luminaire units in addition to enabling the control of power delivery thereto, and control device(s) capable of communicating with the luminaire units wirelessly.

Typically a plurality of luminaire units 104 are disposed in a predetermined space or environment, which may refer to industrial, office or residential environments all alike, yet both outdoors and indoors. The luminaire units 104 are provided with mutually compatible, i.e. message transfer enabling, communication interfaces that are preferably wireless as being already discussed hereinbefore. In some embodiments, e.g. Bluetooth Low-Power™, ZigBee™ and/or Z-Wave™ may be considered.

The luminaire unit 104 may incorporate or be at least functionally (typically electrically) connected, as indicated by the vertical broken line, to a user-operable switch 106 such as the aforementioned, potentially wall pre-installed, toggle or other type of switch device 106 that can be used to provide both control signal and connect external power supply, typically mains in home environment, to the luminaire unit 104. The switch 106 may produce audible sound or 'click' upon operation or 'toggling'. Further, the luminaire unit 104 preferably incorporates a number of integrated and/or at least functionally connected light sources 110, such as LEDs (please note that traditional-looking bulbs have been depicted in the upper part of the figure for illustrative purposes). Yet, it 104 at least functionally comprises a control logic entity 108 and communication interface coupled therewith, and supplementary electronics like detection/wake up circuit and/or internal reserve power supply, e.g. a capacitor, described herein. The switch 106 is typically operated manually by the user 101 through finger action, for example. The luminaire unit 104 is, preferably by means of the control logic entity 108, configured to detect switch operation based on the associated signals.

Thus, in some embodiments, the switch 106 and/or control logic entity 108 may be integrated with the luminaire unit 104, e.g. within the housing or body thereof. Alternatively, the luminaire unit 104 may be associated with physically non-integrated but functionally connected, typically electrically connected, switch 106 and/or control logic entity 108. In some embodiments, switch 106 and control logic entity 108 may in any case be integrated.

Advantageously, the luminaire units 104 are capable of establishing a so-called mesh network 102. Routing of messages and related data in the network 102 may be implemented through a flooding method, for example. A luminaire unit 104 may be configured to forward a message received from any node of the network, such as another luminaire unit 104, to one or more, potentially all, other nodes preferably except the node from which the message was received and/or originating. Alternatively or additionally, further routing methods may be applied. The mesh network 102 may be considered as a kind of special ad hoc network wherein the position of the nodes typically remains somewhat static.

As mentioned hereinbefore, one applicable communication method includes Bluetooth Low Energy™. Either single mode or dual-mode implementation may be exploited. Optionally, the protocol stack may be revised to better suit each particular use scenario of the present invention. Preferably, the related roles may be dynamically determined or switched between the nodes. However, preferably the luminaire units 104 appear as standard Bluetooth devices to the control devices 112, 112B such as mobile terminals 112.

The control devices 112, 112B may include both dedicated remote controllers and general purposes devices provided with functionality, such as software application 114, to interact with or command the luminaire units 104. Preferably, the control devices 112, 112B are provided with an intuitive UI potentially including a graphical UI 114B, 114C. The graphical UI 114B, 114C may enable visualization of luminaire units 104/light sources 110 relative to their actual physical location. For example, a photograph or other visual representation of the space wherein the luminaire units 104 are located may be shown to the user 101 that may then inspect and/or adjust the related settings through selecting the luminaire unit 104 under interest using a control input means such as touchscreen and/or keys or buttons provided in the device 112, 112B. Additionally or alternatively, list view(s) regarding the near-by luminaire units 104 and/or internal settings thereof may be provided.

Figure 2:
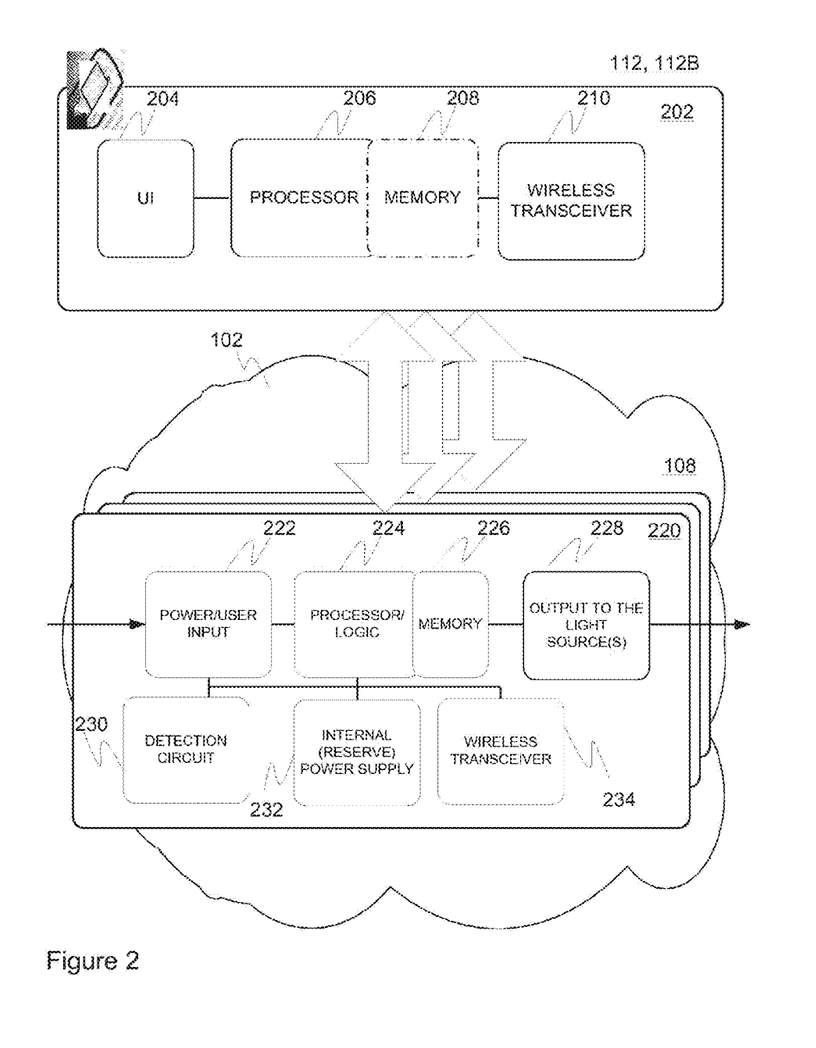
FIG. 2 is a block diagram depicting the internals of embodiments of a luminaire control logic entity and external control device.

FIG. 2 includes block diagrams depicting, in a high-level fashion, the internals 220, 202 of embodiments of a luminaire control logic entity 108 and external control device 112, 112B. Control devices 112, 112B may be generally utilized to control a plurality of luminaire units 104, which has been illustrated in the figure by the multiple instances of the control logic internals 220 and one instance of the control(ling) device internals 202. Alternatively or additionally, a single luminaire unit 104, or control logic entity thereof 108, may be configured to communicate and/or follow the commands provided by one or more control devices 112, 112B.

Both the control device 112, 112B and control logic entity 108 may be typically provided with one or more processing devices 206, 224, respectively, capable of processing instructions and other data, such as one or more microprocessors, micro-controllers, DSP's (digital signal processor), programmable logic chips, etc. The processing entities 206, 224 may thus, as functional entities, physically comprise a plurality of mutually co-operating processors and/or a number of sub-processors connected to a central processing unit, for instance. In many preferred embodiments, the control logic entity 108 may include only a single, relatively simple and low-power, processing device such as a microcontroller of predetermined type.

The processing entities 206, 224 may be configured to execute the application code stored in the memories 208, 226, respectively. The memory entities 208, 226 may be physically realized utilizing one or more physical memory chips or other memory elements. In some embodiments, memory entity 208, 226 may be integrated with the corresponding processing entity 206, 226 as highlighted in the figure by the dotted outline of the entity. The memory 208, 226 may further refer to and include other storage media such as a preferably detachable memory card, a floppy disc, a CD-ROM, or a fixed storage medium such as a hard drive. The memory 208, 226 may be non-volatile, e.g. ROM (Read Only Memory), and/or volatile, e.g. RAM (Random Access Memory), by nature. Preferably, at least some non-volatile memory is included in the devices 112, 112B, 108 to preserve the necessary logic for operating and controlling the arrangement of the present invention over sleep state or shut down periods with no power supply to the memories 208, 226.

Software (product) for carrying the application logic may be provided on a non-volatile carrier medium such as a memory card, a memory stick, an optical disc (e.g. CD-ROM or DVD), or some other memory carrier, or transmitted over a network or other communication wired or wireless channel.

The UI (user interface) 204 may comprise a display and a keyboard/keypad or other applicable user (control) input entity such as a touchscreen and/or a voice control input, or a number of separate keys, buttons, knobs, switches, a touchpad, a joystick, and/or a mouse, configured to provide the user 101 with practicable data visualization and control means. The UI 204 may include one or more loudspeakers and associated circuitry such as D/A (digital-to-analogue) converter(s) for sound output, and optionally a microphone with A/D converter for sound such as voice input.

Communications interface 210 such as a number of wired and/or wireless transmitters, receivers, and/or transceivers for communication with other devices such as terminals and/or network infrastructure(s) are provided. Preferably at least a wireless interface for communicating with luminaire units is implemented. Non-limiting examples of the generally applicable communication technologies include WLAN (Wireless LAN, wireless local area network), LAN, WiFi, Ethernet, USB (Universal Serial Bus), GSM (Global System for Mobile Communications), GPRS (General Packet Radio Service), EDGE (Enhanced Data rates for Global Evolution), UMTS (Universal Mobile Telecommunications System), WCDMA (wideband code division multiple access), CDMA2000, LTE (Long Term Evolution), Bluetooth™, Bluetooth Low Energy™, ZigBee™, and Z-Wave™, the last three of which are preferably the ones from which the communication technology to interact with the wireless communication interface 234 of the control logic entities 108 of luminaire units 104 is selected. The interface 234 shall naturally include a compatible transceiver for possible communication with the external devices such as control devices 112, 112B.

Additionally, control logic entity 108 includes an input element 222 such as a connector receiving electric power and/or related user (control) input as triggered by the switch operation by the user 101. Between the switch 106 and control logic entity 108, e.g. suitable wiring or cabling may be provided.

In practice, the input 222 may often include element(s) such as a number of connectors, conductors, related electronics, etc. utilized to funnel the switch (power) signal into the control logic entity 108. Typically the connection between the switch 106 and the control logic entity 108 is electrical and wired to enable channeling control instructions by cleverly switching the power signal powering the control logic entity 108 with light source(s) 110.

A detection element 230, or typically a power, current and/or signal detection circuit, or wake-up circuitry, may, notwithstanding the used terminology, be provided to recognize switch action and resulting power delivery (or correspondingly shortage) based on the input signal so as to control or inform the processing device 224 to execute associated task(s) including e.g. light source control, message reception, message transmission, switching into active state, switching into sleep state, booting up and/or closing down.

Item 232 refers to internal power supply of the control logic entity 108 enabling monitoring switch state and listening communication/communicating relative to external entity/entities even when the external power supply is disconnected from the luminaire unit 104 by a switching action (or simply power shortage), for example. The power supply 232 may include a capacitor and/or preferably rechargeable battery of predetermined capacity among other options.

Correspondingly, the output element 228 refers to the typically electrical connection such as electrical connector(s) and/or wiring towards the light source(s) under the control of the luminaire unit 104 if not integrated therewith.

Alternatively, in some cases e.g. optical connections or generally other electromagnetic connections could be utilized regarding the input/output interfaces.

It is clear to a skilled person that the shown internals 202, 220 may comprise a number of additional functional and/or structural elements for providing advantageous communication, processing or other features, whereupon this disclosure is not to be construed as limiting the presence of the additional elements in any manner.

Figure 3:
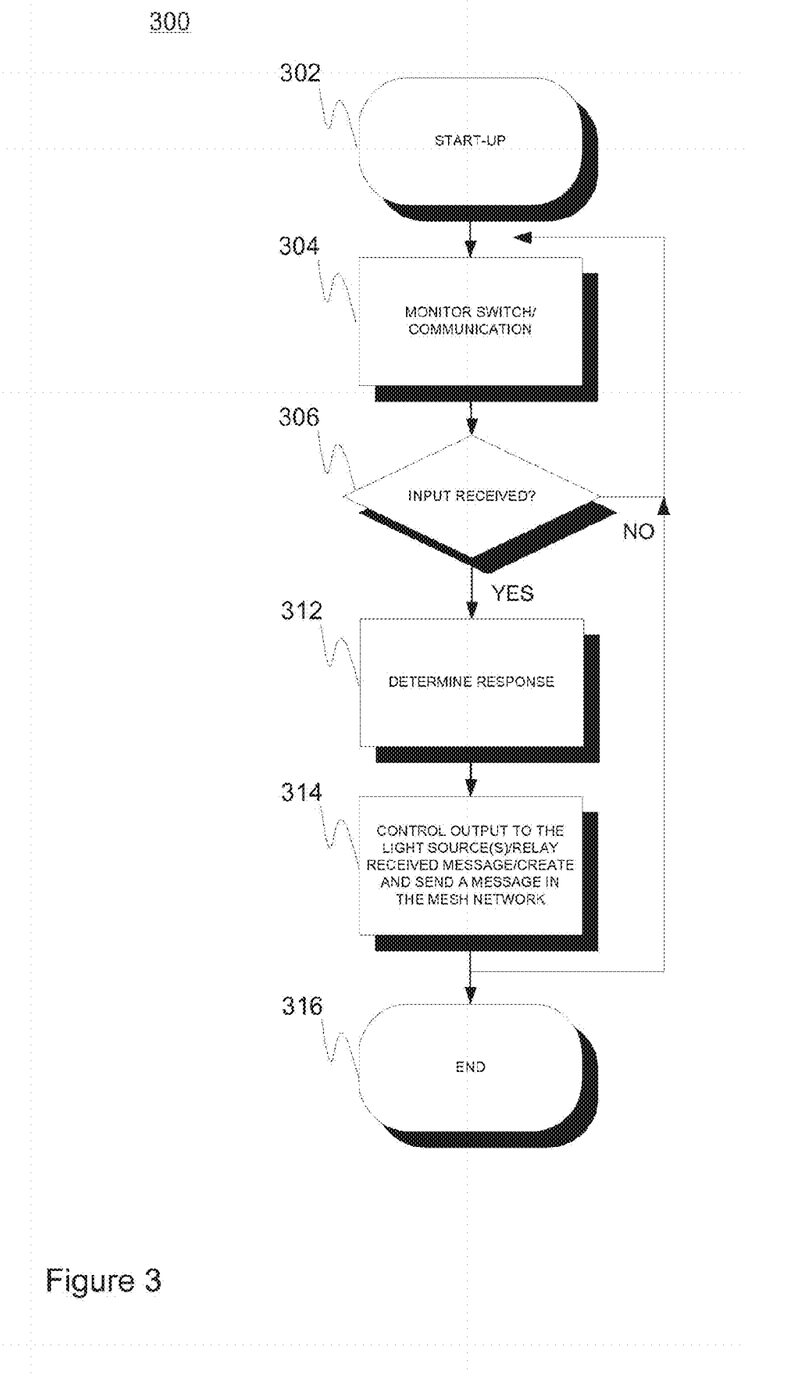
FIG. 3 is a flow chart disclosing an embodiment of a method in accordance with the present invention for intelligent lighting control.

FIG. 3 includes, at 300, a flow chart disclosing an embodiment of a method in accordance with the present invention for dynamic, configurable lighting control.

At 302, the elements of the arrangement of the present invention enabling the execution of the method are obtained, installed/disposed and at least initially configured. Such elements include a number of luminaire units, switches and optionally control devices. The control devices may be mobile whereas the other elements are typically, however not necessarily, static or fixedly installed. Regarding multipurpose control devices, they may be provided with software to communicate with the luminaire units as mentioned hereinbefore at this stage.

At 304, one or more luminaire units of the arrangement monitor the signal(s) from the associated switches, potentially surface-mounted such as wall-mounted power (toggle) switches, for controlling the delivery of electric power to one or more lights (often by simply closing or opening the associated electric circuit). Alternatively (in case no switch (connection) exists) or additionally (typically the case with luminaire units also connected to a switch), the luminaire units are monitoring message traffic arising from other luminaire units or control devices.

Item 306 refers to the detection of switch signal input (signal activity, basically) or message input, whereupon the execution moves over to subsequent items starting from 312. Otherwise, the execution of monitoring tasks, e.g. by the detection/wake-up circuit and wireless transceiver, may be continued.

At 312, response to the detected event(s), such as power switch signal or received message, is determined in accordance with the predetermined logic stored at the luminaire unit. The logic may be generally stored by means of the software comprising a plurality of instructions, or executable software code, defining the desired actions relative to a number of predetermined events such as input signals to be detected. The logic, even if possibly initially consisting of merely factory settings, is preferably configurable by the user, advantageously wirelessly via a control device.

For example, association between a certain switch signal and related light source control action or between a wirelessly received message and a light control action (and/or transmission of a message) may be determined. The association is preferably dynamically alterable by the user via a control device or via the switch operation (configuration pulses).

In some embodiments, the association, or response, may depend on a plurality of factors naturally including the input switch signal or message received from another luminaire unit or control device. Further factors such as context information not necessarily explicitly signaled via the switch signal or captured message but still affecting the response may include at least one element selected from the group consisting of: time, time of day, week day, sensor data, light sensor output, identity of a sender (e.g. terminal) of a received message, audio sensor output, alarm sensor output, door sensor output, smoke sensor output, status of power supply, status of external power supply, status of internal power supply, status of light source(s), number of luminaire units perceived in the network (e.g. through traffic monitoring), and the state of the luminaire (as mentioned hereinbefore, the luminaire may circulate between predetermined states in response to the sequential detections of a predetermined switch signal or wireless message, i.e. 'nonsymmetric' response). The data indicative of various factors' status may be obtained at a luminaire unit by means of integrated sensor(s) and/or messages received from external devices such as sensors, alarm systems, remote control devices, and/or other applicable appliances.

Naturally different luminaire units may contain at least partly mutually different associations. For example, luminaire unit associated with one location such as building entrance may be associated with different response in the case of the same input switch signal or captured wireless message than another luminaire unit disposed somewhere else, e.g. certain room of the building.

As mentioned hereinbefore, depending on the applied communication protocol the luminaire units may have been configured to dynamically switch associated roles (e.g. master, slave) to enable fluent communication of messages.

As already briefly disclosed hereinearlier, the input switch signal may indicate, except e.g. light source control instructions, a controlling, or 'master', luminaire unit selection instruction regarding the unit the switch is directly associated with. This master selection or appointment signal may be provided in connection with local light source adjustment (switch) operation or as a result of separate, or 'isolated', switch operation.

In one exemplary use scenario, a user desires to control several luminaire units via a single unit, although several units may have been associated with dedicated control switches, typically e.g. pre-installed, 'fixed' wall-power switches. The user may then independently adjust, via the associated switches and/or control terminal originated messages, the luminaire units to adopt target (use) settings regarding a number of parameters such as dimming level/brightness of light source(s). For instance, the level of dimming or illumination brightness could be adjusted by on/off, back-and-forth type, switching action whereto the luminaire unit responds by triggering a ramp-like increase in the light emission of the light source(s) until a following on/off action or other corresponding predetermined switching action is provided and the illumination level is set to correspond to the instant of providing the following action. In the future, such level could be conveniently directly obtained by a simpler switch action, for example, by just turning the switch in 'on' position. Similar methodology is applicable to adjusting other parameters as well. The user may then also provide a master unit selection signal/message to the luminaire unit he/she wants to utilize as a master unit.

Depending on the embodiment, such master selection signal may be provided in connection with other control action(s) e.g. as a supplementary back-and-forth type switching action following the local adjustment, or as a separate predetermined signal.

Responsive to recognizing such master selection (switch) signal or a corresponding message received from a control terminal, the concerned new master unit may immediately inform other units about the selection by a message in the mesh network. Alternatively, such discrete role change advertising signal is not sent, but the messages sent by the master unit responsive to the local switching action to enable the other luminaire units to react accordingly, may comprise an indication of the master role of the sender, for example. As a further example, solely the master units may be allowed to construct new control messages, whereas the slaves may only relay them. In case master/slave roles are allocated by a control terminal, the control terminal may optionally inform all the necessary units (masters and slaves) about the allocation.

Nevertheless, the control switch device directly associated with the master luminaire may be thus utilized to control a number of other, if not all, luminaires within the mesh network. The master issues predetermined control messages in the mesh network based on the switch signals to enable controlling the group. Each luminaire unit in the group may still provide individual (different), e.g. factory-, control terminal- or switch-programmed, response(s) to such messages.

In other words, each luminaire unit may still be preferably controlled independently (locally) but switch actions in connection with the master unit may automatically turn into control messages that the other luminaires listen to and act accordingly through the control of the associated local light source(s), for instance.

In some embodiments, several master units may be simultaneously utilized such that at least the slave units follow one or more, potentially all, of them. Optionally even a master unit may be configured to follow one or more other master units.

Further, the messages output by the luminaire units may be exploited, not just at other luminaire units in the mesh, but also by external devices such as the control devices or other devices for adjusting e.g. predetermined ambient parameters such as soundscape through a stereo system or other applicable means.

At 314, the determined response is put into practice, which may refer to executing the light source control action, relaying a received message, and/or constructing and sending a new message in the mesh network, for example.

At 316, the method execution is ended. As being clear to a skilled person, the execution of the shown method items may be, and typically is, repetitive as indicated by the dotted loopback arrow, and their temporal relationship is not strictly sequential, i.e. they may overlap. For example, determining and executing a response to a detected event or input may occur substantially simultaneously with the receipt of further input via the switch or wireless communication means.

Consequently, a skilled person may on the basis of this disclosure and general knowledge apply the provided teachings in order to implement the scope of the present invention as defined by the appended claims in each particular use case with necessary modifications, deletions, and additions.

The invention claimed is:

1. A lighting arrangement comprising:
a plurality of luminaire units, each luminaire unit provided with at least one dedicated light source and at least functionally connected control logic entity with a wireless transceiver, said plurality of luminaire units being configured to communicate via a network established utilizing the wireless transceivers thereof,
wherein at least one of said luminaire units is at least electrically connected to a user-operable switch device, for controlling the luminaire unit, and
wherein the control logic entity associated with said at least one luminaire unit is configured to, upon detection of a predetermined signal responsive to the operation of the control switch device, transmit a predetermined message via the wireless transceiver to enable other luminaire units in the network receiving the message to execute a responsive luminaire or a light source, control action as configured in the control logic entities thereof relative to the captured message,
wherein the network is a mesh network based on Bluetooth® low energy data transfer in compliance with Bluetooth® 4.0 specifications,
wherein the control logic entity of said at least one luminaire unit is further configured to determine and trigger, in response to said detection of the signal, at the luminaire unit a first control action of the at least one light source thereof, and
wherein the control logic entity of said at least one luminaire unit is, in response to a subsequent detection of the same predetermined switch signal, configured to trigger a second, different control action of the at least one light source thereof.

2. The arrangement of claim 1, wherein the detected predetermined signal comprises a sequence of a plurality of signal states or pulses.

3. The arrangement of claim 1, wherein said at least one dedicated light source comprises at least one semiconductor light source.

4. The arrangement of claim 1, wherein the first control action includes adapting at least one feature selected from the group consisting of: brightness, color, color tone, alignment, illumination pattern, and blinking or strobing sequence.

5. The arrangement of claim 1, wherein,
the user-operable switch device includes an at least two positions providing power switch, and
the control logic entity of said at least one luminaire unit is, in response to the subsequent detection of the same predetermined switch signal, further configured to transmit a further message, different from said predetermined message, towards the other luminaire units.

6. The arrangement of claim 1, wherein at least one other luminaire unit of said plurality is configured to relay the message received to enable further luminaire units in the mesh network to capture it, and wherein said at least one other luminaire unit is further configured to determine and trigger a control action of the at least light source thereof based on the message.

7. The arrangement of claim 1, wherein the control logic entity of each luminaire unit is configured to wirelessly receive a control message from an external control terminal and execute an associated control action of one or more light sources thereof, and to relay the message.

8. The arrangement of claim 7, comprising said control terminal, being a general purpose wireless mobile terminal, a smartphone, or tablet provided with dedicated control application, for receiving user input via a user interface and converting the received user input into a control message and also representing the status, graphical illustration of the location, of the luminaire units to the user via the user interface, wherein the user interface further comprises a touchscreen.

9. The arrangement of claim 1, wherein said at least one luminaire unit is configured to detect a predetermined master luminaire unit selection signal responsive to the operation of the control switch device.

10. The arrangement of claim 9, wherein said at least one luminaire unit is configured to apply such detection as a requisite for the transmission of the predetermined message based on the operation of the control switch.

11. The arrangement of claim 9, wherein said at least one luminaire unit is configured to transmit, via the wireless interface, an indication of the master unit status thereof, in said predetermined message, to other luminaire units in the mesh network or a control terminal.

12. The arrangement of claim 9, wherein said at least one luminaire unit is configured to detect a signal responsive to the operation of the control switch device or receive a message from other luminaire unit in said mesh network or from a control terminal, wherein said signal or message indicates the end of the master role of said at least one luminaire unit.

13. The arrangement of claim 1, wherein the wireless transceivers comply with least one technology selected from the group consisting of:
   Bluetooth low-energy wherein the mesh network is based on Bluetooth low energy data transfer in compliance with Bluetooth 4.0 specifications,
   Z-Wave, and
   ZigBee.

14. The arrangement claim 1, configured to utilize flooding as a routing technique for the messages in the mesh network.

15. The arrangement of claim 1, configured to wirelessly transmit a control message towards a predetermined appliance such as audio or video reproduction, heating, or cooling appliance in response to the switch signal or a message wirelessly received from an external device, including a control terminal.

16. A luminaire unit for use with an arrangement according to claim 1, comprising a control logic entity with a wireless transceiver, to cooperate with at least one light source to illuminate the environment, said luminaire unit being configured to communicate with one or more other luminaire units within range via a network established utilizing the wireless transceiver thereof,
   wherein said luminaire unit is at least electrically connected to a user-operable switch device, for controlling the luminaire unit, and
   the control logic entity being configured to, upon detection of a predetermined signal responsive to the operation of the switch device, transmit a predetermined message via the wireless transceiver to enable the other luminaire units in the network to execute a responsive luminaire, or a light source, control action as configured in the control logic entities thereof relative to the captured message, wherein
   the network is a mesh network based on Bluetooth® low energy data transfer in compliance with Bluetooth® 4.0 specifications,
   wherein the control logic entity of said at least one luminaire unit is further configured to determine and trigger, in response to said detection of the signal, at the luminaire unit a first control action of the at least one light source thereof, and
   wherein the control logic entity of said at least one luminaire unit is, in response to a subsequent detection of the same predetermined switch signal, configured to trigger a second, different control action of the at least one light source thereof and to transmit a further message, different from said predetermined message, towards the other luminaire units.

17. The luminaire unit of claim 16 wherein the control logic entity comprises detection circuit for monitoring the switch signal or changes therein and alarming or waking up a processing unit of the control logic entity in response thereto.

18. The luminaire unit of claim 16, comprising an internal power source.

19. A method for controlling a plurality of luminaire units, each provided with at least one dedicated light source, and at least functionally connected control entity with a wireless transceiver, said plurality of luminaire units being configured to communicate via a network established utilizing the wireless transceivers thereof, wherein at least one of said luminaires is electrically connected to a user-operable switch device, said method comprising:
   detecting, at said at least one luminaire, signal, or a signal sequence, triggered by switching action,
   determining, in response to said detection, at said luminaire unit a control action of the at least one light source and a message to be wirelessly transmitted in said network to enable other luminaire units in the network to execute a responsive luminaire control action as configured in the control logic entities thereof based on the captured message, and
   executing the control action and transmission of the message,
   wherein the network is a mesh network based on Bluetooth® low energy data transfer in compliance with Bluetooth® 4.0 specifications,
   wherein the control logic entity of said at least one luminaire unit is further determines and triggers, in response to said detection of the signal, at the luminaire unit a first control action of the at least one light source thereof, and
   wherein the control logic entity of said at least one luminaire unit, in response to a subsequent detection of the same predetermined switch signal, triggers a second, different control action of the at least one light source thereof.

20. The method of claim 19, wherein,
   the user-operable switch device is an on/off power switch, and
   the control logic entity of said at least one luminaire unit, in response to the subsequent detection of the same predetermined switch signal, further transmits a further message, different from said predetermined message, towards the other luminaire units.

* * * * *